United States Patent [19]

Pascucci et al.

[11] Patent Number: 4,578,538
[45] Date of Patent: Mar. 25, 1986

[54] METHOD AND APPARATUS FOR COMMUNICATING DIGITAL SIGNALS OVER TELEPHONE LINES

[75] Inventors: Gregory A. Pascucci, Waukesha; Paul G. Kucharski, Franklin, both of Wis.

[73] Assignee: Johnson Service Company, Milwaukee, Wis.

[21] Appl. No.: 610,963

[22] Filed: May 16, 1984

[51] Int. Cl.$^4$ ................. H04M 11/00; H04Q 1/38
[52] U.S. Cl. ................. 179/2 DP; 370/78; 340/825.08
[58] Field of Search .......... 179/2 DP, 5 R; 370/78, 370/96; 340/825.02, 825.08

[56] References Cited

U.S. PATENT DOCUMENTS 3,711,651  1/1973  Connell ............................ 370/78
4,468,655  8/1984  Iwata ............................. 179/5 R
4,520,488  5/1985  Houving et al. .

Primary Examiner—Keith E. George
Attorney, Agent, or Firm—Shupe Larry L.; Joseph J. Jochman, Jr.; John Phillip Ryan

[57] ABSTRACT

A method for effecting the communication of digital signals over telephone lines includes the steps of generating a voltage at a first level for providing an inactive state signal directed to a plurality of slave transceiver units and generating a voltage at a second level for provding a first carrier detect signal directed to the slave units. A digitally encoded first data signal is then generated, has a peak amplitude at a third voltage level and is also directed to the slave units. In response to the first carrier detect and first data signals, a voltage will be generated at a fourth level for providing a second carrier detect signal directed to a master transceiver unit. Thereupon, a digitally encoded second data signal will be generated to have a peak amplitude at a fifth voltage level and is also directed to the master transceiver unit. An active bridge apparatus for effecting the communication of digital signals over telephone lines includes an isolated input circuit adapted to be coupled to a master transceiver unit by a single, twisted first pair telephone line. The unit includes a control section for transmitting an inactive state signal at a first voltage level to a plurality of slave transceiver units, each of which is adapted to be coupled to the bridge apparatus by a single, twisted pair telephone line. Other signals identifiable at disclosed voltage levels may be transmitted and received to effect both control and communications.

12 Claims, 10 Drawing Figures

METHOD AND APPARATUS FOR COMMUNICATING DIGITAL SIGNALS OVER TELEPHONE LINES

TECHNICAL FIELD

This invention relates to electronic digital communications and more particularly, to a method and apparatus for effecting the communication of digital signals over a single, twisted pair telephone line in half duplex baseband form using a plurality of voltage levels.

BACKGROUND ART

Electronic digital communication systems are in wide use and find application in a variety of process control systems including those related to building automation systems (BAS) used for heating, ventilating and air conditioning (HVAC) control and related energy management, fire and security applications. In known BAS architectural networks, an exemplary multistory office building may be equipped with a computerized central processing unit (CPU) which is electrically coupled to lower-level electronic controllers and thence to the working apparatus such as mechanical heaters, chillers, fire detection and control hardware, security devices and other equipment. The CPU, the other electronic controllers and the mechanical equipment are frequently coupled together for electronic communications therebetween by shielded coaxial cable using relatively large diameter conductors, 18 ga. being exemplary. Such dedicated wiring permits the transmission of voltage signals having relatively large amplitude to minimize the effect of noise and signal attenuation. The topology of such a network is characterized by a predominance of relatively short interconnections and "daisy chain" links to minimize the total wiring which is required to be installed in the building.

More recently, it has been noted that a typical building voice communication system will include one or more private branch exchanges (PBX) and a large number of voice communication devices such as telephones, all interconnected by relatively long runs of small diameter, unshielded twisted pair wires arranged proximate one another to define wiring bundles. Each wire of a twisted pair may typically be of 24 ga. size, thereby permitting a low cost installation suitable for the conduction of relatively small amplitude voltage signals to avoid undesirable cross interference between pairs. The use of the PBX wiring for effecting BAS communications is highly desirable from an overall installed cost standpoint. However, the aforedescribed differences in network topology and wiring electrical characteristics require a novel approach for best data communications.

One approach to the use of PBX wiring for data communications is to use telephone modems with analog active bridging. With this approach, the active bridge both receives and transmits analog signals of varying frequency which are summed and amplified by the bridge. Another approach is to use digital rather than analog signals by employing one twisted pair for the transmission and reception of control signals and a second twisted pair for the transmission and reception of the related digital data signals. While these approaches have heretofore been satisfactory, they tend to be characterized by certain disadvantages. In particular, analog active bridging has attendant thereto an inordinantly high cost as such equipment is normally designed for voice grade telephone networks. In the latter approach using digital signals, two twisted pair (four individual wires) are required for communication and control. This necessitates the installation of additional PBX wiring for each communication channel and unnecessary costs will result. A method and apparatus for effecting digital communications over a single twisted pair telephone line which uses a plurality of voltage levels to provide both control and digital data signals would be an important advance in the art.

DISCLOSURE OF THE INVENTION

In general, a method for effecting the communication of digital signals over telephone lines includes the steps of generating a voltage at a first level for providing an inactive state signal directed to a plurality of slave transceiver units and generating a voltage at a second level for providing a first carrier detect signal directed to the slave units. A digitally encoded first data signal is then generated, has a peak amplitude at a third voltage level and is also directed to the slave units. Responding to the first carrier detect and first data signals, a voltage will be generated at a fourth level for providing a second carrier detect signal directed to a master transceiver unit. Thereupon, a digitally encoded second data signal will be generated to have a peak amplitude at a fifth voltage level and is also directed to the master transceiver unit.

An active bridge apparatus for effecting the communication of digital signals over telephone lines includes an isolated input circuit adapted to be coupled to a master transceiver unit by a single, twisted first pair telephone line. First means are included for transmitting an inactive state signal at a first voltage level to a plurality of slave transceiver units, each of which is adapted to be coupled to the bridge apparatus by a single, twisted pair telephone line. The apparatus also includes second means for transmitting a first carrier detect signal at a second voltage level to the slave units and third means for transmitting a digitally coded first data signal to the slave units. The first data signal has a peak amplitude at a third voltage level. The bridge apparatus also includes means for transmitting a second carrier detect signal to the master transceiver unit, this signal being at a fourth voltage level. A fifth means is also included for transmitting a digitally encoded second data signal to the master transceiver unit and this data signal has a peak amplitude at a fifth voltage level.

It is an object of the invention to provide a method and apparatus for effecting data communications over a single twisted pair telephone line which overcomes the disadvantages of known approaches.

Yet another object of the present invention is to provide a method and apparatus which permits such data communications at acceptably high rates while yet avoiding a requirement for adjustment or tuning.

Another object of the present invention is to provide a method and apparatus for permitting a single master transceiver unit to communicate with a plurality of slave transceiver units while maintaining electrical isolation between the slave transceivers.

Still another object of the present invention is to provide a method and apparatus for permitting simultaneous data and voice communications on telephone lines installed adjacent to one another in a wiring bundle and without electrical interference therebetween. How these and other objects are accomplished will become more apparent from the following detailed description taken in conjunction with the accompanying drawing.

BEST MODE FOR CARRYING OUT THE INVENTION

Figure 1:
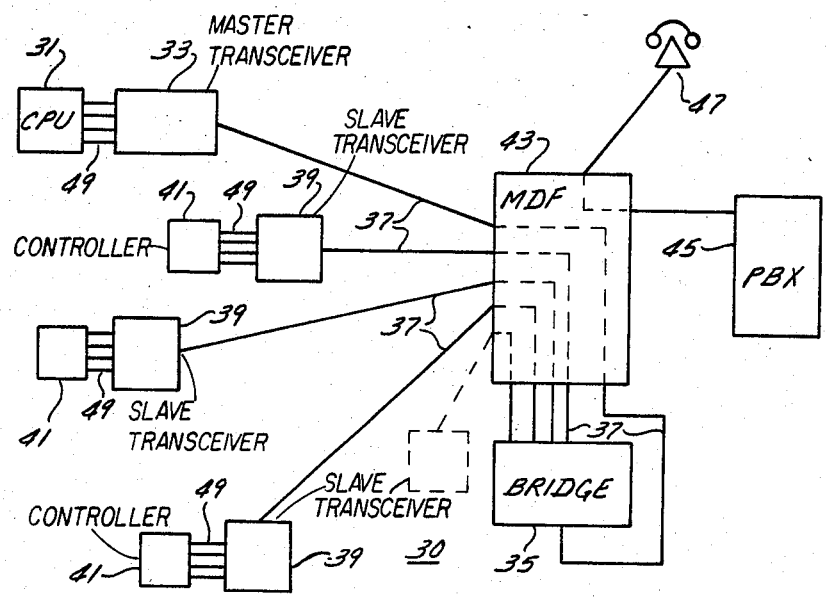
FIG. 1 is a simplified schematic diagram of a process control system using the inventive apparatus and adapted to carry out the method of the invention.

Referring first to FIG. 1, a process control system 30 embodied as a BAS is shown to include a CPU 31 coupled by a first, master transceiver unit 33 to an active bridge apparatus 35 by a single, twisted pair telephone line 37. The bridge apparatus 35 is, in turn, coupled to a plurality of second slave transceiver units 39, each of which is in communication with a low-level controller 41. Coupling between the bridge apparatus 35 and each slave unit 39 is likewise by a single, twisted pair telephone line 37. The system architecture is depicted in conjunction with a main distribution frame 43 (MDF), the latter comprising a large number of wire termination strips disposed at a central location within a building. Through the MDF, there is also connected the PBX 45 and a representative large number of telephone instruments 47. In the depiction, the MDF 43 functions merely as a convenient interconnection means for coupling together the master transceiver unit 33, the bridge apparatus 35 and the slave transceiver units 39. The CPU 31 may be embodied as a high level controller such as the JC85/40 while the low-level controllers 41 may be embodied as DSC8500 devices, both being products of Johnson Controls, Inc. of Milwaukee, Wis. The linking control lines 49 between the CPU 31 and the master transceiver unit 33 and between the slave transceiver units 39 and their associated controllers 41 are configured generally in accordance with the Electronics Industry Association (EIA) serial data communication standard RS-232-C, modified to provide signals at TTL voltage levels rather than at those voltage levels specified by the aforementioned standard. It will become apparent from the foregoing and from the following specification that the master transceiver unit 33 and the slave units 39 function as voltage conversion devices for interfacing, respectively, the CPU 31 and the bridge apparatus 35 and the bridge apparatus 35 and the low level controllers 41.

Figure 2:
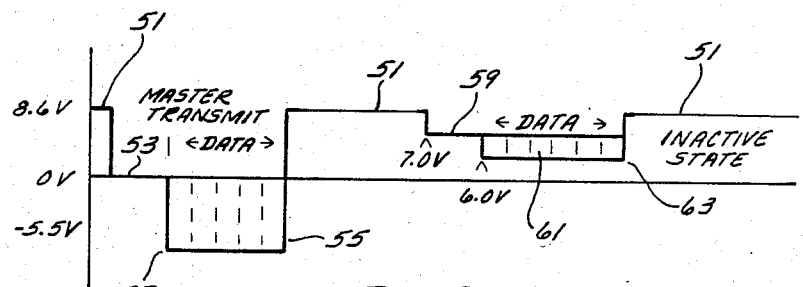
FIG. 2 is a graphical depiction of the multi-level voltage signals used for digital data transmission and control over a single, twisted pair telephone line.

Understanding of the inventive method and apparatus will be aided by an understanding of the various voltage signals which may be present on a single, twisted pair telephone line 37. Accordingly, FIG. 2 depicts a simplified control and data signal string as might be transmitted from the master transceiver unit 33, regenerated by the bridge apparatus 35 and received at all of the slave transceiver units 39. In response to the data encoded within these signals, the addressed controller(s), one or more of the controllers 41, and the slave transceiver unit 39 associated therewith, will sequentially generate a transmission which is received at the bridge apparatus 35, regenerated therewithin, and retransmitted to the master transceiver unit 33 for assimilation by the CPU 31.

More particularly, with the system 30 in a quiescent state, the master transceiver unit 33 will generate a voltage at a first level 51 for providing an inactive state signal which is directed to the slave transceiver units 39. Upon receiving an appropriate signal from the CPU 31 which indicates that data is to be sent from the CPU 31 to one or more of the controllers 41, the master unit 33 will generate a voltage at a second level 53 for providing a first carrier detect signal which is directed to the slave units 39. After a brief time delay defining a clear-to-send signal, the master unit 33 will generate a digitally encoded first data signal 55 which is directed to the slave units 39 and has a peak amplitude at a third voltage level 57. This first data signal 55 is likewise generated as commanded by the CPU 31. At the conclusion of the transmission of the first data signal 55, the CPU 31 and therefore the master unit 33 will cause a return to the first voltage level 51 signalling an inactive state. While all slave transceiver units 39 will receive the message encoded within the first data signal 55, this signal 55 will be uniquely addressed for assimilation and response by a particular controller 41 and its associated slave unit 39. Referring further to FIG. 2, the addressed controller 41 and slave transceiver unit 39 which is thereby caused to responsively transmit to the master unit 33 and thence to the CPU 31 will generate a voltage at a fourth level 59 which provides a second carrier detect signal to the master unit 33. Thereafter, the slave unit 39 will generate a digitally encoded second data signal 61 which has a peak amplitude at a fifth voltage level 63 and is likewise directed to the master transceiver unit 33. Subsequent to this responsive data transmission by the slave unit 39, it generates an inactive state signal at the first voltage level 51.

It will be appreciated by those of ordinary skill in the art in view of the above description that the voltages at the various levels 51, 53, 57, 59, 63 which may emanate from either the master transceiver unit 33 or from a responsive slave transceiver unit 39 are received at the bridge 35 and regenerated therein for retransmission in substantially identical form. It will also be appreciated that any one of a variety of voltage level systems might be employed for effecting control and data signals. For example, such a system may be represented by a graphical depiction similar to FIG. 2 except fully inverted to represent voltage levels of equivalent magnitudes but of polarities opposite from those shown. Other combinations of voltage levels may be selected as well. However, in a preferred embodiment, the first voltage level 51 will be in the range of +8.2 VDC to +9.0 VDC, the second voltage level 53 will be in the range of −1.0 VDC to +1.0 VDC, the third voltage level 57 will be in the range of −3.0 VDC to −9.0 VDC, the fourth voltage level 59 will be in the range of +7.2 VDC to +6.5 VDC and the fifth voltage level 63 will be in the range of +5.7 VDC to +5.0 VDC. In accordance with one aspect of the system 30, it is preferred that any voltage transcending between the voltage at a first level 51 and that at a second level 53 or a fourth level 59 and providing a carrier detect signal be caused to transcend through a voltage of +7.25 VDC.

Figure 3A:
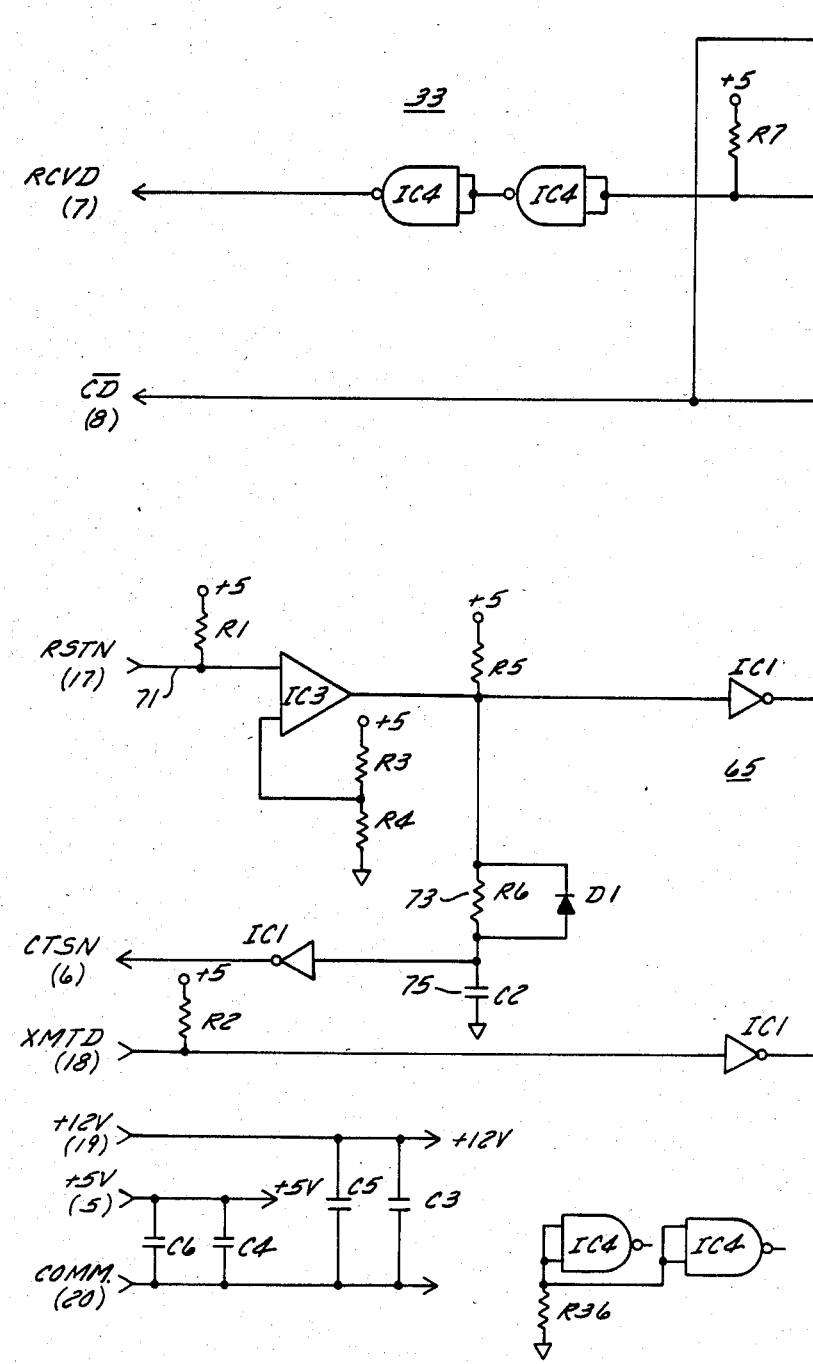
FIGS. 3A and 3B, taken together at the indicated match lines, depict the electrical schematic diagram of a master transceiver unit.
Figure 3B:
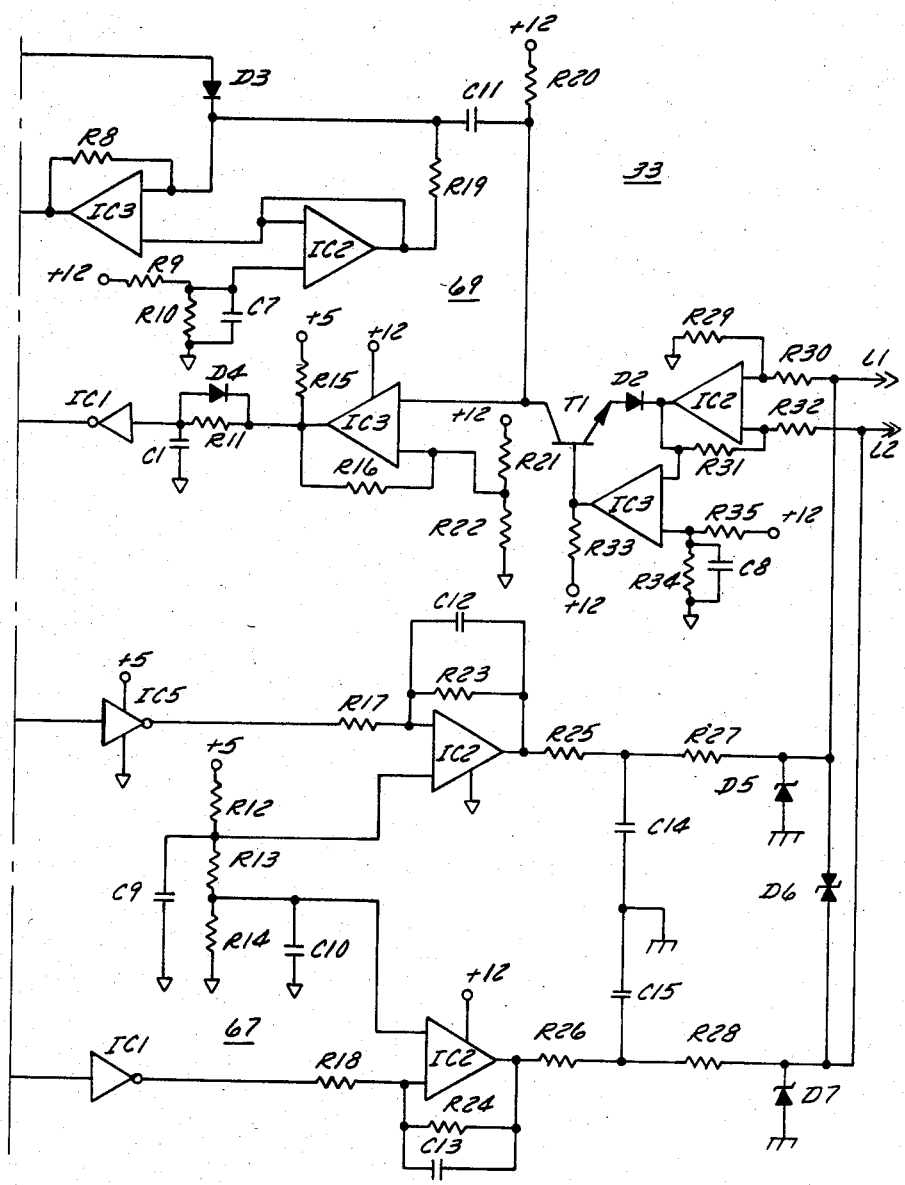

Referring additionally to FIGS. 3A and 3B, the master transceiver unit 33 is shown to include a master control section 65, a master transmission section 67 and a master receiving section 69. The control section 65 is adapted for generating an inactive state signal or a first carrier detect signal, depending upon the logic state of the RTSN line 71, whether high or low, respectively. This section 65 also generates a clear-to-send signal after a time delay which is initiated by the RTSN line 71 being brought to a logic low state, the time delay being caused by the cooperative effect of the resistor 73 and capacitor 75. The transmission section 67 is adapted for generating a digitally encoded first data signal while the receiving section 69 detects response signals emanating from a slave transceiver unit 39 which are transmitted through the bridge 35 to the section 69 and thence are propagated to the CPU 31.

Figure 4A:
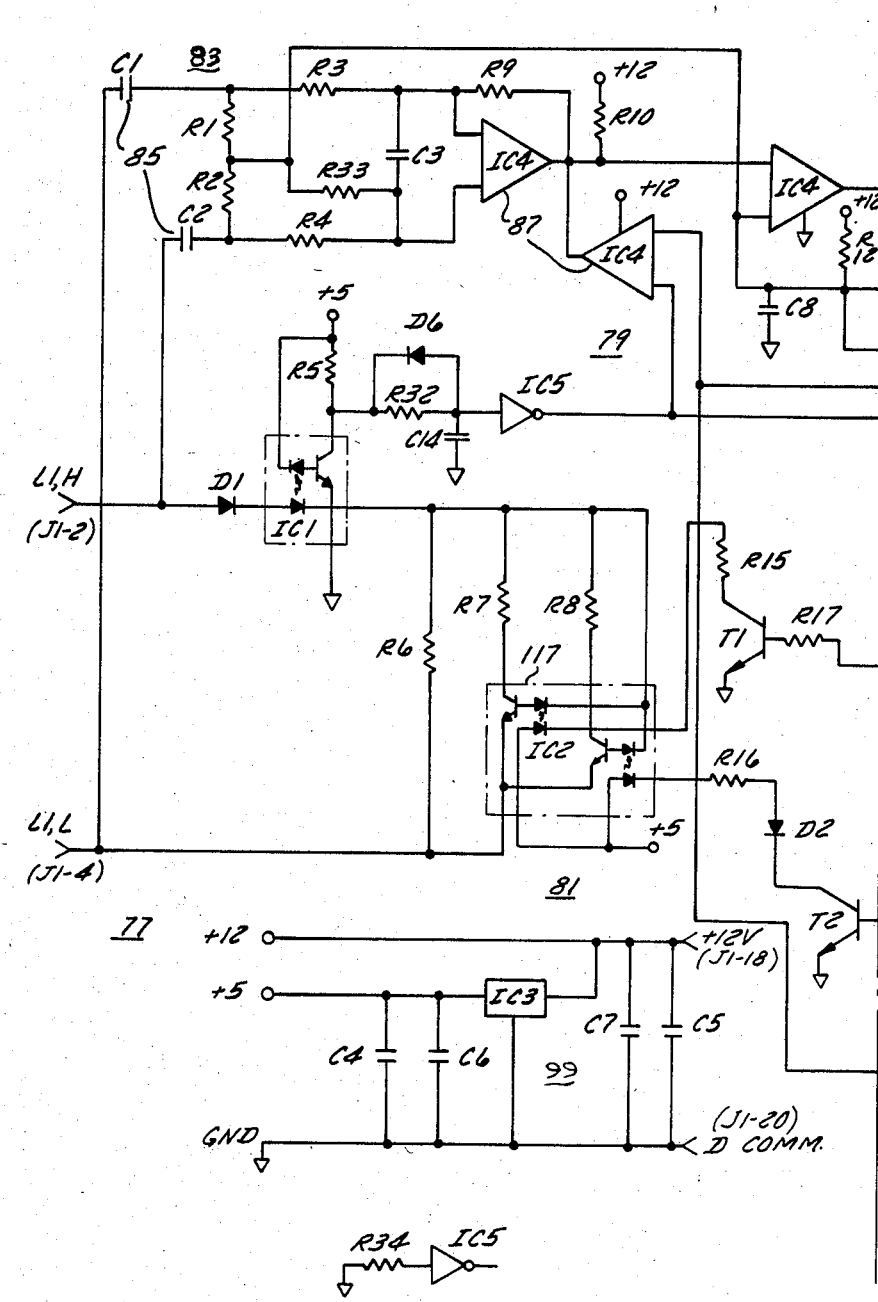
FIGS. 4A and 4B, taken together at the indicated match lines, depict the electrical schematic diagram of the master section of the active bridge apparatus.
Figure 4B:
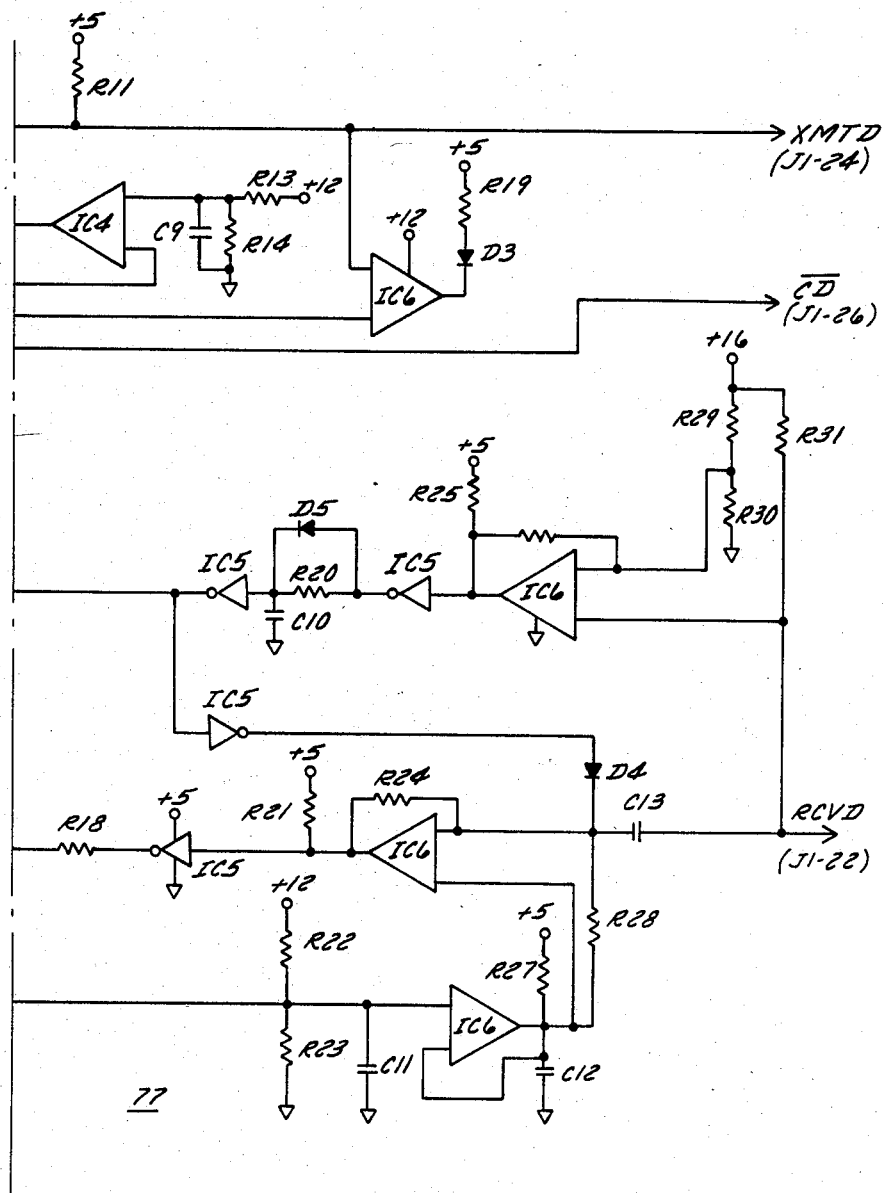

Referring additionally to FIGS. 4A and 4B, the master section 77 the active bridge apparatus 35 is shown to include a bridge propagation circuit 79 and a bridge impedance modulator 81. The propagation circuit 79 regenerates the first carrier detect signal and the first data signal 55, both such signals being received from the master transceiver unit 33 and both such signals being propagated along the single, twisted pair line 37 coupling the unit and the apparatus 35. A capacitive data detection circuit 83 is adapted to sense transitions in voltage signals in that series capacitors 85 function to block steady state DC signals while yet permitting the passage of signals represented by a rapid transition between two DC voltage values, thereby applying voltages to the comparators 87.

Figure 5A:
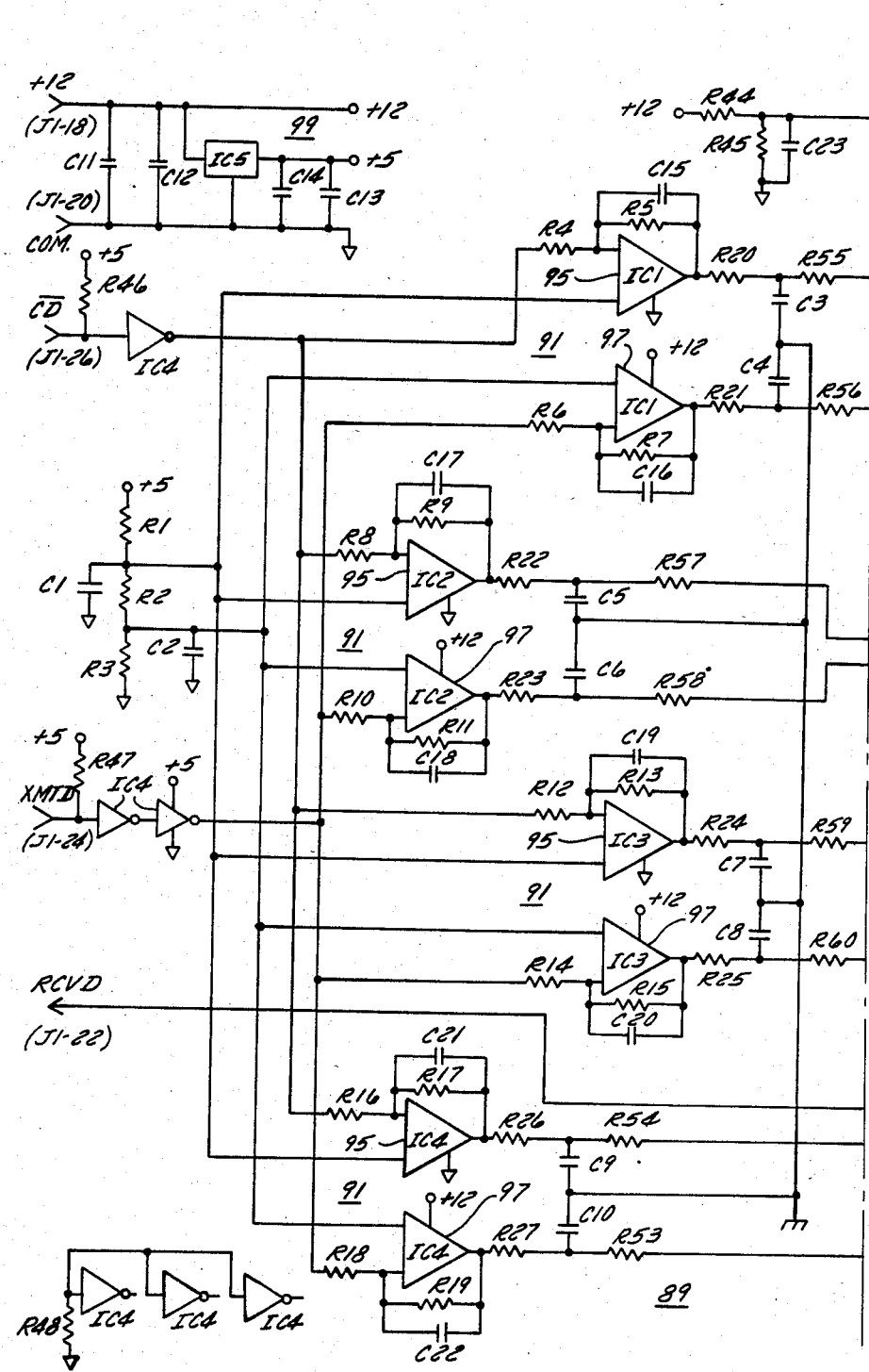
FIGURES 5A and 5B, taken together at the indicated match lines, depict the electrical schematic diagram of the line driver section of the active bridge apparatus.
Figure 5B:
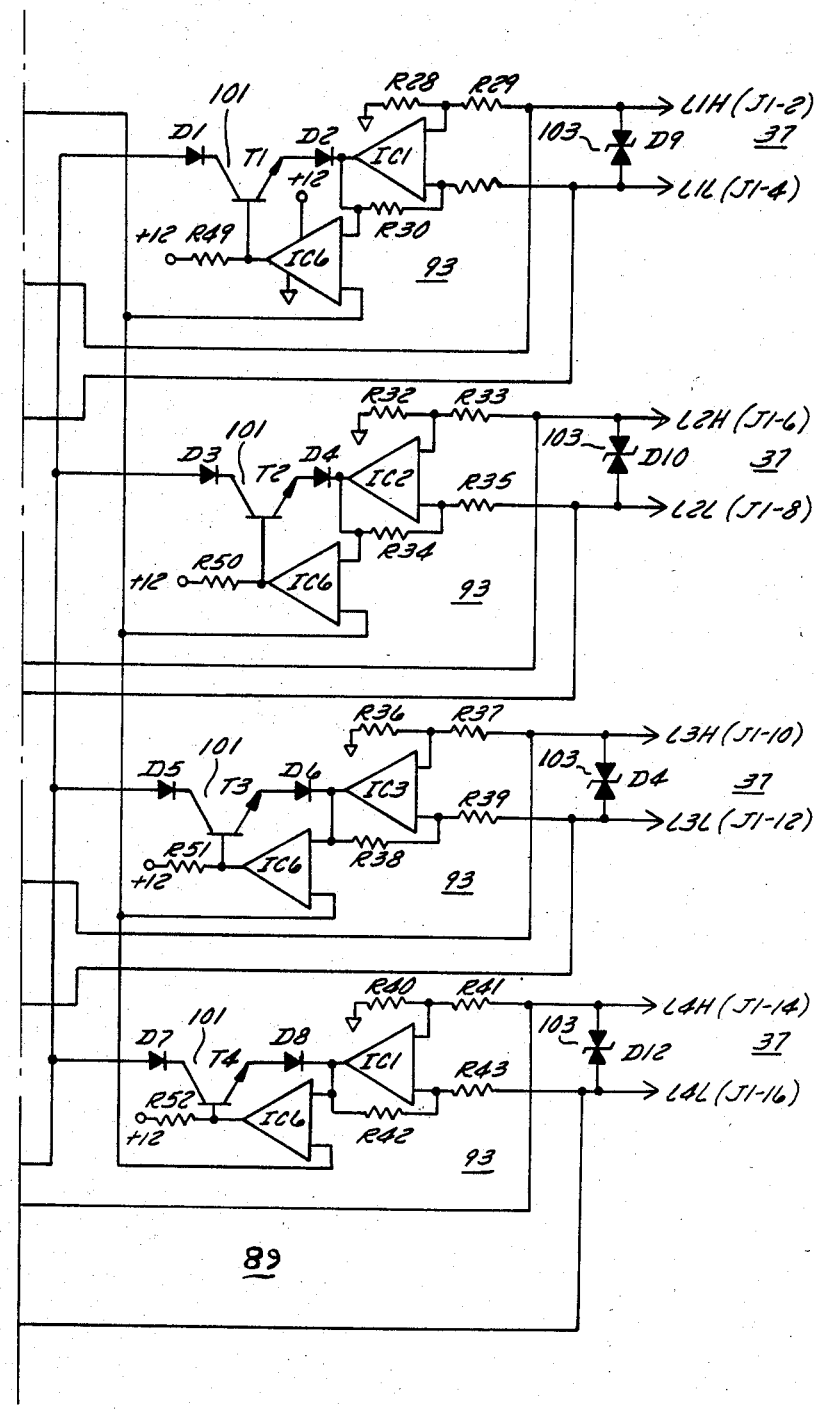

Referring additionally to FIGS. 5A and 5B, these carrier detect and first data signals 55 are directed to the line driver section 89 having a plurality of bridge tandem amplifier circuits 91 and a plurality of line protection circuits 93, the tandem amplifier circuits 91, each including a first amplifier 95 and a second amplifier 97. The first amplifier 95 provides a carrier detect signal upon the single, twisted pair 37 which connects the bridge apparatus 35 to each slave unit 39 and the second amplifier 97 provides a first data signal 55 to the plurality of slave units 39. The line protection circuits 93 function to buffer data and control signals being received into the bridge 35 from a transmitting slave unit 39 and directs these buffered signals to the bridge impedance modulator 81 of FIG. 4A. The modulator 81 thereupon transmits the second carrier detect and the second data signal 61 to the master receiving section 69 shown in FIGS. 3A and 3B. The line protection circuit 93 monitors the voltage between the wires comprising any twisted pair line 37 and a short circuit, resulting in 0 VDC therebetween, will switch the transistor 101 to a non-conducting state, thereby isolating the line 37 from the balance of the section 89. A bidirectional Zener diode 103 provides interline protection against spurious transients. Regulated power supplies are provided within the bridge master section 77 and the line driver section 89 for providing the necessary circuit voltages.

In operation and referring to all FIGURES, it is first assumed that the CPU 31 is in a quiescent state wherein no command signals are required to be transmitted through any of the slave units 39 to their associated controllers 41. In that quiescent or inactive state, and particularly referring to FIG. 3A, the RCVD, CD, RTSN, CTSN and XMTD lines will all be at the logic high state at TTL levels. At that time, the voltage at line L1 of FIG. 3B will be at nominally 8.6 VDC with respect to line L2.

When the CPU 31 desires to generate a message to be acted upon by a particular slave unit 39, the RTSN line of FIG. 3A is brought to a logic low state which causes a reduction in the voltage on line L1 to a second or carrier detect level and also initiates a time delay, the lapse of which will bring the CTSN line to a logic low state, thereby signalling the CPU 31 that data may now be transmitted. Thereupon, the CPU 31 will repetitively change the logic level on the XMTD line which will in turn, repetitively impress a voltage upon line L2 at a third level and which, in the preferred embodiment is negative with respect to L1.

Referring particularly to FIG. 4A, the appearance of the first carrier detect signal upon line L1 at a second voltage level 53 will cause the propagation circuit 79 to provide a carrier detect signal upon the circuit output line. This signal is directed to the first amplifiers 95 of the tandem amplifier circuits 91 shown in FIG. 5A which thereupon regenerates this first carrier detect signal, causing it to appear simultaneously on all of the single, twisted-pair lines 37 coupling the bridge 35 with each of the several slave units 39.

The receipt of the first data signals 55 at line L2 of FIG. 4A will cause the propagation circuit 79 to switch, through capacitors, to provide a first data signal 55 upon the second output line of the propagation circuit. This data signal 55 is directed to the second amplifiers 97 of the tandem amplifier circuits 91 shown in FIG. 5A and thence is propagated to all single, twisted pair lines 37 coupling the bridge apparatus 35 with each slave unit 39.

Figure 6A:
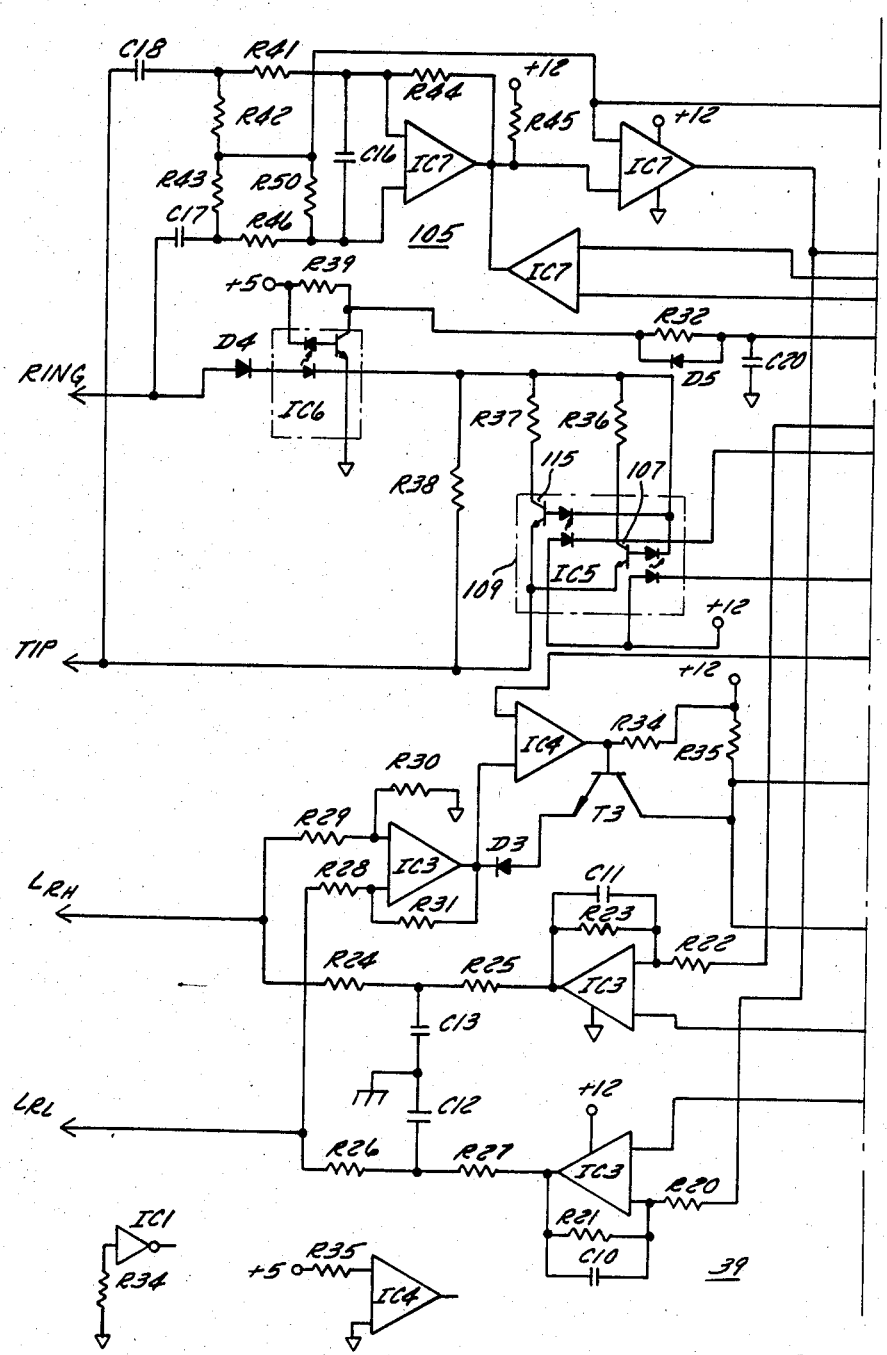
FIGS. 6A and 6B, taken together at the indicated match lines, depict the electrical schematic diagram of a slave transceiver unit.
Figure 6B:
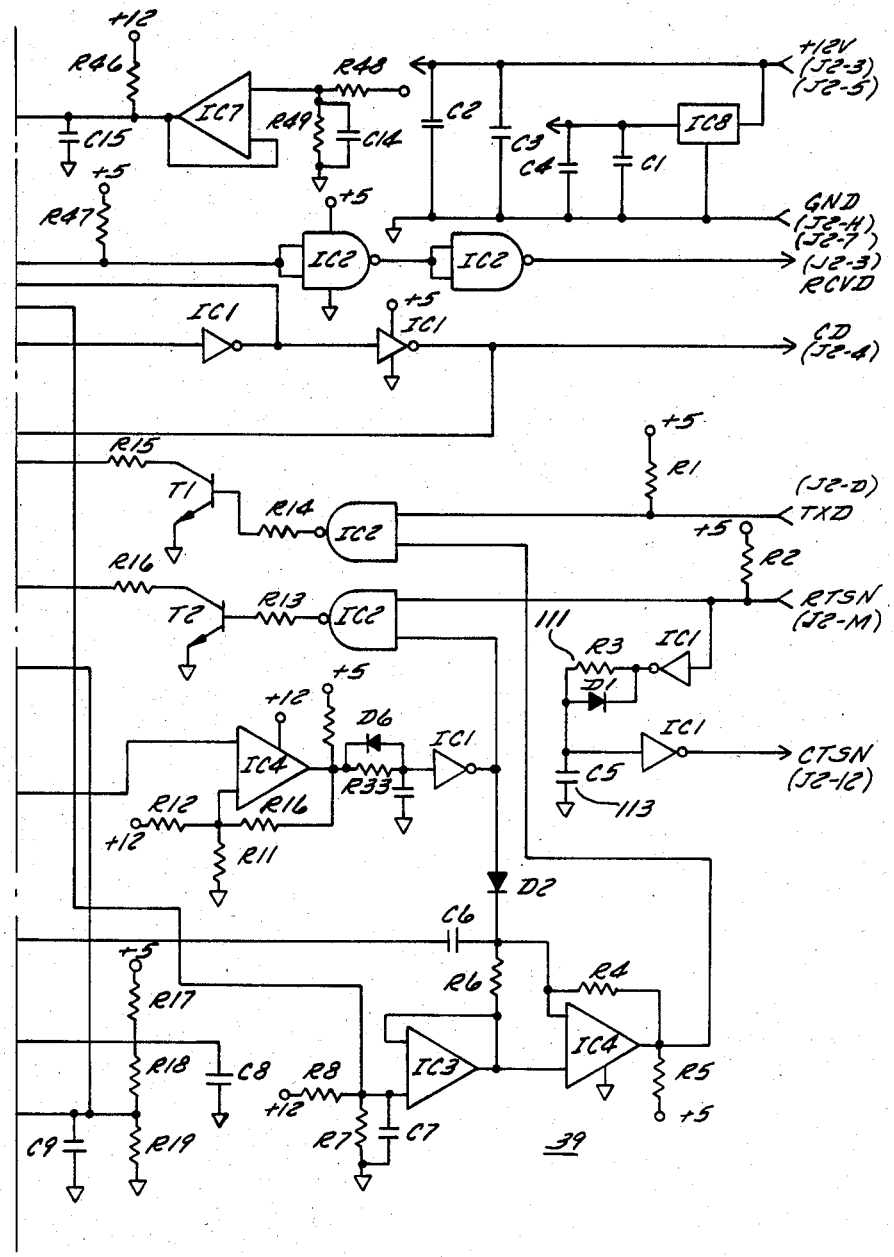

Referring particularly to FIGS. 6A and 6B, the receipt of these regenerated first carrier detect and first data signals 55 at the addressed controller 41 and its associated slave transceiver unit 39 will cause its slave propagation circuit 105 to generate carrier detect and data signals 55 upon its first and second output lines, respectively. These signals are then directed to the particular controller 41 coupled to that slave unit 39. Since the data signals 55 are digitally coded for a particular controller 41, only the addressed controller 41 will respond and the manner of handling the responsive signals is closely similar to that used to handle signals emanating from the CPU 31. When a particular controller 41 wishes to responsively transmit, the RTSN line of FIG. 6B is brought to a logic low state. By optical coupling, the first transistor 107 of the impedance modulator circuit 109 is shorted, thereby impressing the carrier detect signal upon the L1 line of FIG. 6A by bringing the voltage upon that line to a fourth level 59 with respect to line L2. After the lapse of a time delay caused by the effect of the resistor 111 and capacitor 113 which results in a clear-to-send signal, the controller 41 transmits data by modulating the logic level of the XMT line of FIG. 6B. By optical coupling, the second transistor 115 of the modulator circuit 109 is intermittently shorted, causing the voltage on line L2 of FIG. 6A to be brought to a fifth level 63, thereby generating a second data signal 61. This data signal 61 is received by that line protection circuit 93 of FIG. 5B which is coupled to the transmitting slave 39 and for purposes of subsequent explanation, it will be assumed that the slave unit 39 of the addressed controller 41 is that unit coupled to the active bridge apparatus 35 by the twisted pair denominated as Line L1H-L1L in FIG. 5B. The second carrier detect signal and second data signal 61 are directed to the RCVD line of FIG. 4B and thence to the bridge impedance modulator 117, the function of which is identical to the slave impedance modulator 109 described above. These signals are detected by the master receiving section 69 of FIGS. 3A and 3B, the first portion of which senses the carrier detect signal and the second portion of which senses the second data signal 61 and directs it to the CPU 31.

It will be apparent from the foregoing and after considering the drawing that the magnitude and polarity of the voltage levels 51, 53, 57, 59, 63 are portrayed and described as having such relationships with respect to the particular line, L1H or L1L, considered to be the reference line at a particular instant. As an example, when the master transceiver unit 33 transmits a digitally coded "1" to the slave transceiver units 39, L1 or L1H as the case may be, will be at nominally zero potential with respect to L2 or L1L, as portrayed by level 53. When the unit 35 transmits a digitally coded "0" to the units 39, the potential of L1 (L1H) will be in the range of −3.0 VDC to −9.0 VDC, nominally at −5.5 VDC, with respect to L2 (L1L).

As a further example and when a slave unit 39 responsively transmits to unit 33, a second carrier detect signal is provided at a fourth level 59 in a range of 7.2 VDC to +6.5 VDC, nominally +7.0 VDC, measurable at L1 (L1H) with respect to L2 (L1L). This second carrier detect signal is provided by switching the second transistor 115 to a conductive state. Thereafter, the second data signal 61 is provided by controllably switching the first transistor 107 between conducting and non-conducting states. When conducting, the fifth voltage 63 is measurable at L1 (L1H) with respect to L2 (L1L).

The inventive method and apparatus has been found useful for effecting the communication of digital signals over telephone lines at a rate of about 9600 BAUD without interference from adjacent voice communication lines and without a need for adjustment of tuning.

The following components have been found useful in the preferred embodiment where resistances are in ohms and capacitances are in microfarads, unless otherwise specified.

| FIGS. 3A and 3B | | | |
|---|---|---|---|
| IC1 | CD40106B | IC2 | TL074 |
| IC4 | CD4093B | IC3 | LM339N |
| T1 | 2N3904-5 | R1-5, R33, 36 | 10K |
| R7, 15, 20 | 2.2K | R8 | 1.5 M |
| R9 | 20K | R10 | 4.02K |
| R6 | 432K | R12 | 3.32K |
| R13 | 806 | R14 | 10.7K |
| R16 | 200K | R17 | 243K |
| R18, R11 | 301K | R19 | 51.1K |
| R21 | 11.8K | R22 | 26.7K |
| R23 | 402K | R24 | 340K |
| R25-28 | 52.3 | R29-32, R35 | 100K |
| R34 | 47.5K | C7-10 | .1 mf |
| C1 | .001 mf | C11 | 220 pf |
| C12, 13 | 68 pf | C2 | .022 mf |
| C3, 4, 14, 15 | .047 mf | C5, 6 | 15 mf |
| D1, 2,, 3, 4 | 1N4448 | D5, D7 | 1.5KE15 |
| D6 | 1.5KE15C | | |
| (BIPOLAR) FIGS. 4A and 4B | | | |
| IC1 | HCPL 6N138 | IC2 | HCPL 2531 |
| IC3 | LM 7805 | IC5 | CD40106B |
| IC4, 6 | LM 339N | R1, 2 | 11K |
| R3, 4 | 2.05K | R6 | 4.99K |
| R7 | 1.21K | R8 | 604 |
| R13, 14 | 10K | R17, 18 | 13.7K |
| -continued | | | |
| R16 | 110 | R15 | 200 |
| R20, R32 | 301K | R22 | 20K |
| R23 | 4.02K | R26 | 200K |
| R28 | 51.1K | R29 | 16.5K |
| R30 | 52.3K | R24 | 1.5 M |
| R10, 12, 21, 34 | 4.7K | R11, 25, 31 | 2.2K |
| R19 | 220 | R5, R27 | 1K |
| C1, 2 | 500 pf | C3 | 30 pf |
| C4, 5 | 15 mf | C6, 7 | .047 mf |
| C9, 11 | .1 mf | C10, 14 | .001 mf |
| C8, 12 | 10 mf | C13 | 220 pf |
| D1, 4, 5, 6 | 1N4448 | D2 | GREEN LED |
| D3 | RED LED | T1, 2 | 2N3904 |
| R9, R33 | 499K | | |
| FIGS. 5A and 5B | | | |
| IC1, 2, 3 | TL074 | IC4 | CD40106B |
| R1 | 3.32K | R2 | 806 |
| R3 | 10.7K | R4, 8, 12, 16 | 243K |
| R5, 9, 13, 17 | 402K | R6, 10, 14, 18 | 301K |
| R7, 11, 15, 19 | 340K | R20-27, 53-60 | 52.3 |
| R28-44 | 100K | R45 | 30.1K |
| R46, 47 | 1 M | R48-52 | 10K |
| C1, 2, 23 | .1 mf 35 V | C3-11, 14 | .047 mf |
| C12, 13 | 15 mf 35 V | C15-22 | 68 pf |
| D1-8 | 1N4448 | IC5 | LM7805 |
| IC6 | LM339N | T1-T4 | 2N3904 |
| D9-D12 | 1.5KE15C | | |
| FIGS. 6A and 6B | | | |
| IC5 | HCPL2531 | IC1 | CD40106B |
| IC2 | CD4093B | IC3 | TL074 |
| IC4, 7 | LM339N | IC6 | HCPL6N138 |
| R1, 2, 34 | 10K | R4 | 1.5 M |
| R5, 45, 46 | 4.7K | R9, 35, 47 | 2.2K |
| R13, 14 | 13K | R6 | 51.1K |
| R7 | 20K | R8, 28-31, 48, 49 | 100K |
| R10 | 200K | R11 | 26.7K |
| R12 | 11.8K | R15, 16 | 634 |
| R17 | 3.32K | R18 | 806 |
| R19 | 10.7K | R20, 32, 33 | 301K |
| R21 | 340K | R22 | 243K |
| R23 | 402K | R24-27 | 52.3 |
| R36 | 1.21K | R37 | 604 |
| R38 | 4.99K | R40, 41 | 2.05K |
| R39 | 1K | C1, 2, 12, 13 | .047 mf |
| C3, 4 | 35 V 15 mf | C5 | .022 mf |
| C6 | 220 pf | C7, 8, 9, 14 | .1 mf |
| C10, 11 | 68 pf | C15 | 35 V 10 mf |
| C16 | 30 pf | C17, 18 | 500 pf |
| D1-6 | 1N4448 | T1, 2, 3 | 2N3904 |
| C19, C20 | .001 mf | R3, R44, R50 | 499K |
| R42, 43 | 11K | IC8 | LM340LAZ-5 |

While only a single prefered method and apparatus have been shown and described, the invention is not intended to be limited thereby but only by the scope of the claims which follow.

We claim:

1. A method for effecting the communication of digital signals over telephone lines and including the steps of:
    generating a voltage at a first level for providing an inactive state signal directed to a plurality of slave transceiver units;
    generating a voltage at a second level for providing a first carrier detect signal directed to said slave units;
    generating a digitally-encoded first data signal directed to said slave units and having a peak amplitude at a third voltage level;
    generating a voltage at a fourth level for providing a second carrier detect signal to a master transceiver unit, and;

generating a digitally-encoded second data signal having a peak amplitude at a fifth voltage level and directed to said master transceiver unit.

2. The method set forth in claim 1 wherein said inactive state, said first carrier detect and said first data signals are generated by said master transceiver unit for transmission to a plurality of slave transceiver units.

3. The method set forth in claim 2 wherein each of said slave units is coupled to an addressable controller, said first data signal is encoded to activate one of said controllers and its slave unit and said second carrier detect and said second data signals are transmitted by said activated slave transceiver unit in response to said first data signal.

4. The method set forth in claim 3 wherein said third voltage level and said fifth voltage level have opposite polarities one from the other.

5. The method set forth in claim 1 wherein said first voltage level and said third voltage level have opposite polarities one from the other.

6. A method for effecting the communication of digital signals over telephone lines and including the steps of:
providing a first transceiver unit adapted to be coupled to an active bridge by a single, twisted pair telephone line;
providing a plurality of second transceiver units adapted to be coupled to said active bridge, said coupling of each of said second units to said active bridge being by a single, twisted pair telephone line;
transmitting a positive voltage at a first level from said first transceiver unit for providing an inactive state signal;
transmitting a voltage at a second level from said first transceiver unit for providing a first carrier detect signal;
transmitting a digitally-encoded first data signal from said first transceiver unit, said first data signal having a peak amplitude at a third, negative voltage level;
transmitting a positive voltage at a fourth level from one of said second transceiver units for providing a second carrier detect signal, and;
transmitting a digitally-encoded second data signal from said one of said second transceiver units, said second data signal having a peak amplitude at a fifth, positive voltage level.

7. The method set forth in claim 6 wherein said plurality of said second transceiver units includes at least three such units and said first data signal is received by at least two of said second transceiver units.

8. The method set forth in claim 6 wherein said first data signal is received by all of said second transceiver units.

9. The method set forth in claim 6 wherein said first data signal is uniquely encoded for an addressable controller coupled to one of said second transceiver units and said transmission of said second data signal is in response to said first data signal.

10. The method set forth in claim 6 wherein said first voltage level is in the range of +8.2 VDC to +9.0 VDC, said second voltage level is in the range of −1.0 VDC to +1.0 VDC, said third voltage level is in the range of −3.0 VDC to −9.0 VDC, said fourth voltage level is in the range of +7.2 VDC to +6.5 VDC and said fifth voltage level is in the range of +5.7 VDC to +5.0 VDC.

11. Active bridge apparatus for effecting the communication of digital signals over telephone lines and including:
an isolated input circuit adapted to be coupled to a master transceiver unit by a single, twisted first pair telephone line;
first means for transmitting an inactive state signal at a first voltage level to a plurality of slave transceiver units, each of said slave units being adapted to be coupled to said bridge apparatus by a single, twisted second pair telephone line;
second means for transmitting a first carrier detect signal at a second voltage level to said slave transceiver units;
third means for transmitting a digitally-encoded first data signal to said slave transceiver units, said first data signal having a peak amplitude at a third voltage level;
fourth means for transmitting a second carrier detect signal to said master transceiver unit, said second carrier detect signal being at a fourth voltage level;
fifth means for transmitting a digitally-encoded second data signal to said master transceiver unit, said second data signal having a peak amplitude at a fifth voltage level.

12. The apparatus set forth in claim 11 wherein said first carrier detect signal and said first data signal are transmitted to said slave transceiver units through a line driver circuit for balancing and preshaping said signals.

* * * * *

UNITED STATES PATENT AND TRADEMARK OFFICE
CERTIFICATE OF CORRECTION

PATENT NO. : 4,578,538
DATED : March 25, 1986
INVENTOR(S) : Pascucci, Gregory A., et al It is certified that error appears in the above-identified patent and that said Letters Patent are hereby corrected as shown below:

Abstract, Line 6 "provding" should be --providing--

Column 1, Line 66 "inordinantly" should be --inordinately--

Column 5, Line 22 --of-- should be added after "master section 77"

Column 7, Line 27 "7.2DC" should be -- +7.2VDC--

Column 8, Line 48 "prefered" should be --preferred--

Signed and Sealed this

Nineteenth Day of August 1986

[SEAL]

Attest:

DONALD J. QUIGG

Attesting Officer

Commissioner of Patents and Trademarks